United States Patent

Dauth et al.

Patent Number: 6,068,929
Date of Patent: May 30, 2000

[54] RADIATION-CURING OR HEAT-CURING ORGANOSILOXANE COMPOSITIONS CONTAINING (METHYL) STYRENE GROUPS

[75] Inventors: Jochen Dauth, Burghausen; Josef Wolferseder, Tann; Bernward Deubzer, Burghausen, all of Germany

[73] Assignee: Wacker-Chemie GmbH, Munich, Germany

[21] Appl. No.: 09/072,211

[22] Filed: May 4, 1998

[30] Foreign Application Priority Data

May 2, 1997 [DE] Germany ............................ 197 18 634

[51] Int. Cl.$^7$ ........................... C08F 283/12; B32B 27/00
[52] U.S. Cl. ............................. 428/447; 528/32; 522/99; 526/279
[58] Field of Search ............................. 526/279; 528/32; 522/99; 428/447

[56] References Cited

U.S. PATENT DOCUMENTS

| | | | |
|---|---|---|---|
| 3,480,584 | 11/1969 | Archer et al. | 260/46.5 |
| 4,259,467 | 3/1981 | Keogh et al. | 526/279 |
| 4,605,712 | 8/1986 | Mueller et al. | 525/474 |
| 4,640,849 | 2/1987 | Woods et al. | 427/54.1 |
| 5,118,723 | 6/1992 | Irifune et al. | 522/99 |
| 5,145,915 | 9/1992 | Weitemeyer et al. | 525/403 |
| 5,231,157 | 7/1993 | Merzig et al. | 528/15 |
| 5,241,034 | 8/1993 | Merzig et al. | 528/15 |
| 5,593,787 | 1/1997 | Dauth et al. | 428/447 |

FOREIGN PATENT DOCUMENTS

| | | |
|---|---|---|
| 0176481 | 4/1986 | European Pat. Off. |
| 0105341 | 1/1987 | European Pat. Off. |
| 0439777 | 9/1994 | European Pat. Off. |
| 0618237 | 10/1994 | European Pat. Off. |
| 0423688 | 12/1995 | European Pat. Off. |
| 0716114 | 6/1996 | European Pat. Off. |
| 9322368 | 11/1993 | WIPO. |
| 9322369 | 11/1993 | WIPO. |

*Primary Examiner*—Margaret G. Moore
*Attorney, Agent, or Firm*—Brooks & Kushman P.C.

[57] ABSTRACT

Novel organosiloxane compositions which contain (methyl) styrene groups and can be prepared on the basis of A) oligomeric or polymeric organosilicon compounds comprising at least one unit of the formula $$GR_cSiO_{(4-c-1)/2} \quad (I)$$

or at least one unit of the formula (I) and at least one unit of the formula $$O_{(4-c-1)/2}R_cSi\text{—}G^1\text{—}R_cSiO_{(4-c-1)/2} \quad (II)$$

B) monomeric alkenyloxy compounds, maleates, fumarates, maleimides, (meth)acrylates, (methyl) styrenes, acrylamides, itaconic esters and/or oligomeric or polymeric organosilicon compounds containing on average more than one alkenyloxy, maleate, fumarate, maleimide or (meth)acrylate group, where R are identical or different hydrocarbon radicals which may be halogenated or unhalogenated or a radical of the formula $$\text{—}R^1\text{—}[OCH_2CH_2]_o\text{—}[OCH(CH_3)CH_2]_p\text{—}[O(CH_2)_4]_q\text{—}OR^2,$$

where
$R^1$ is a linear or branched alkylene radical,
$R^2$ is a hydrogen atom, an alkyl radical or a radical of the formula —CO—$R^3$, where $R^3$ is an alkyl radical,
G is a radical of the formula (IV) —$R^4$-(phenyl) which is substituted by [—$Y_{(5-d)}$] and (—$R^5_d$), with the proviso that at least one radical $R^5$ is present and
$G^1$ is a radical of the formula (V) —(phenyl)-($R^4$)$_d$— which is substituted by [—$Y_{4-d}$], where
$R^4$ is a linear or branched, substituted or unsubstituted alkylene radical,
$R^5$ is a vinyl radical or isopropenyl radical,
Y can be identical or different and each Y is a hydrogen atom or is as defined for R, or is a radical of the formula —$OR^6$, where
$R^6$ is a $C_{1-8}$ alkyl radical optionally interrupted by an ether oxygen atom, and
c is 0, 1 or 2, on average from 0.0 to 2.0,
d is 1, 2 or 3,
o is 0 or an integer from 1 to 100,
p is 0 or an integer from 1 to 100, and
q is 0 or an integer from 1 to 100, with the proviso that the sum o+p+q is >0.

20 Claims, No Drawings

RADIATION-CURING OR HEAT-CURING ORGANOSILOXANE COMPOSITIONS CONTAINING (METHYL) STYRENE GROUPS

TECHNICAL FIELD

The present invention pertains to organosiloxane compositions containing (methyl)styrene groups, a process for their preparation, a process for their use, and coatings and moldings which are produced therefrom.

BACKGROUND ART

Crosslinkable organosilicone prepolymers comprising alternating hydrocarbon radicals and cyclic polysiloxanes are described in EP 423688 (Hercules Incorporated), where the prepolymer is built up from nonaromatic polyenes and cyclic polysiloxanes containing three or more ≡SiH groups. Further functionalization can be achieved through use of additional bisalkenyl compounds.

Siloxane copolymers containing alkenyl groups are described in U.S. Pat. No. 5,241,034 (Wacker-Chemie GmbH). The polymerization of (methyl)styrene and α-methylstyrene is known to those skilled in the art. Further, the general method of initiator-free photopolymerization of electron-rich and electron-deficient compounds via charge-transfer complexes is known from EP 618237 (Fusion Systems Corp.).

SUMMARY OF THE INVENTION

The subject invention provides new organosilicon compositions which contain (methyl)styrene groups which can be crosslinked thermally or by exposure to high-energy radiation, optionally in the presence of initiators and or comonomers, to produce products exhibiting improved properties.

DESCRIPTION OF THE PREFERRED EMBODIMENT

The invention provides organosiloxane compositions which contain (methyl)styrene groups and can be prepared on the basis of A) oligomeric or polymeric organosilicon compounds which contain (methyl)styrene groups and comprise at least one unit of the formula $$GR_cSiO_{(4-c-1)/2} \quad (I)$$

or at least one unit of the formula (I) and at least one unit of the formula $$O_{(4-c-\frac{1}{2})}-R_cSi-G^1-R_c-SiO_{(4-c-1)/2} \quad (II)$$

B) monomeric alkenyloxy compounds, maleates, fumarates, maleimides, (meth)acrylates, (methyl) styrenes, acrylamides, itaconic esters and/or oligomeric or polymeric organosilicon compounds containing on average more than one alkenyloxy, maleate, fumarate, maleimide or (meth)acrylate group, where each R is an identical or different hydrocarbon radical, which may be halogenated or unhalogenated, having from 1 to 900 carbon atom(s) per radical or a radical of the formula

where
- $R^1$ is a linear or branched alkylene radical, preferably having from 1 to 8 carbon atom(s) per radical,
- $R^2$ is a hydrogen atom, an alkyl radical having preferably from 1 to 8 carbon atom(s) per radical or a radical of the formula —CO—$R^3$, where $R^3$ is an alkyl radical having preferably from 1 to 8 carbon atom(s) per radical,
- G is a radical of the formula (IV) —$R^4$-(phenyl) which is substituted by [—$Y_{(5-d)}$] and (—$R^5_d$), with the proviso that at least one radical $R^5$ is present and
- $G^1$ is a radical of the formula (V) —(phenyl)-($R^4_d$) which is substituted by [—$Y_{(4-d)}$], where
- $R^4$ is a linear or branched, substituted or unsubstituted alkylene radical having preferably from 2 to 8 carbon atom(s),
- $R^5$ is a vinyl radical or isopropenyl radical,
- Y can be identical or different and each Y is a hydrogen atom, is as defined for R, where R is as defined above, or is a radical of the formula —$OR^6$, where $R^6$ can be identical or different alkyl radical having from 1 to 8 carbon atoms optionally interrupted by an ether oxygen atom, and
- c is 0, 1 or 2, on average from 0.0 to 2.0,
- d is 1, 2 or 3,
- o is 0 or an integer from 1 to 100, preferably 0 or an integer from 3 to 35,
- p is 0 or an integer from 1 to 100, preferably 0 or an integer from 3 to 35, and
- q is 0 or an integer from 1 to 100, preferably 0 or an integer from 3 to 35, with the proviso that the sum o+p+q is >0.

Further components which may be present are
C) if desired, initiators which form free radicals, anions or cations,
D) if desired, inhibitors for regulating the potlife.

Further organosiloxane compositions containing (methyl) styrene groups may additionally comprise units of the formula $$R_aSi(OR^6)_bO_{(4-a-b)/2} \quad (III)$$

where
- R is as defined above and
- $R^6$ are identical or different alkyl radicals having preferably from 1 to 8 carbon atom(s) per radical which may be substituted by an ether oxygen atom,
- a, b are identical or different and are 0, 1, 2 or 3 and the sum a+b is not greater than 3.

Examples of R are, preferably, alkyl radicals such as the methyl, ethyl, n-propyl, iso-propyl, 1-n-butyl, 2-n-butyl, iso-butyl, tert-butyl, n-pentyl, iso-pentyl, neo-pentyl and tert-pentyl radicals; hexyl radicals such as the n-hexyl radical; heptyl radicals such as the n-heptyl radical, octyl radicals such as the n-octyl radical and iso-octyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as o-, m-, p-tolyl radicals; xylyl radicals and ethylphenyl radicals; and aralkyl radicals such as the benzyl radical, the α- and β-phenylethyl radicals. Preference is given to the methyl radical.

Examples of halogenated radicals R are haloalkyl radicals such as the 3,3,3-trifluoro-n-propyl radical, the 2,2,2,2',2',2'-hexafluoroisopropyl radical, the heptafluoroisopropyl radical and haloaryl radicals such as the o-, m- and p-chlorophenyl radicals.

Examples of radicals $R^1$ are preferably alkylene radicals of the formulae

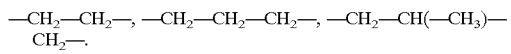

Preferred radicals $R^2$ are a hydrogen atom, and the methyl and n-butyl radicals; and as $R^3$, preference is given to the methyl radical.

Examples of alkyl radicals $R^6$ are preferably the methyl, ethyl, n-propyl, iso-propyl, 1-n-butyl, 2-n-butyl, iso-butyl and tert-butyl radicals. Preference is given to the methyl and ethyl radicals. Examples of alkyl radicals $R^6$ which are substituted by an ether oxygen atom are, preferably, methoxyethyl and ethoxyethyl radicals.

Examples of the radical $R^4$ are preferably

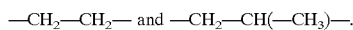

Examples of the radical $R^5$ are preferably

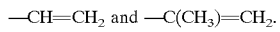

Examples of the preferred component (B) according the invention are dodecyl vinyl ether, t-butyl vinyl ether, diethylene glycol vinyl ether, triethylene glycol divinyl ether, dibutyl maleate, diisooctyl maleate, diethyl fumarate, dibutyl fumarate, N-butylmaleimide, N-octylmaleimide, N-tridecylmaleimide, butyl acrylate, ethyl acrylate, methyl methacrylate, α-methylstyrene, diisopropenylbenzene, styrene, divinylbenzene, acrylamide, acrylonitrile, diethyl itaconate and/or organosilicon compounds having on average more than one alkenyloxy group as described in EP-B 105 341, page 2, lines 38 to 51, EP-B 439 777, page 2, line 29 to page 5, line 24, U.S. Pat. No. 5,145,915, column 2, line 26 to column 3, line 17, WO 93/22368 and WO 93/22369 and/or organosilicon compounds having on average more than one (meth)acrylate group as described in EP 716 114, page 2, line 31 to page 3, line 18 and page 4, line 4 to page 5, line 20 (these documents are hereby incorporated by reference into the disclosure) and/or organosilicon compounds having on average more than one maleimide group such as, preferably, E) organosilicon compounds containing at least one maleimide group of the formula

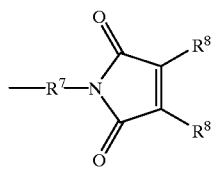

where
$R^7$ is a divalent, substituted or unsubstituted hydrocarbon radical which may contain one or more ether oxygen atoms, and
$R^8$ are identical or different and are each a hydrogen atom or a substituted or unsubstituted hydrocarbon radical having from 1 to 18 carbon atoms.

The organosilicon compounds (E) used here can be any previously known organosilicon compounds which contain maleimide groups and may be monomeric, oligomeric or polymeric, linear, branched or cyclic.

The organosilicon compounds (E) are preferably compounds comprising units of the formula

where
$R^9$ are identical or different and are each a monovalent, halogenated or unhalogenated hydrocarbon radical having from 1 to 18 carbon atoms, X are identical or different and are each a halogen atom or a radical $-OR^{10}$, where $R^{10}$ is an alkyl radical having from 1 to 18 carbon atoms per radical which may be substituted by one or more etheroxygen atoms, J is a radical of the formula (V),
a is 0 or 1,
b is 0, 1, 2 or 3 and
e is 0, 1, 2 or 3,
with the proviso that the sum a+b+e is ≦4 and at least one radical J is present per molecule.

In the organosilicon compounds (E) used herein, the group of the formula (V) is preferably linked to the silicon atom via an SiC bond.

In the organosilicon compounds (E) comprising units of the formula (VI) used herein, a preferably has an average value of from 0.001 to 1.0, b preferably has an average value of from 0 to 3.0 and e preferably has an average value of from 0.0 to 3.0 and the sum a+b+e preferably has an average value of from 0.1 to 4.0.

The organosilicon compounds (E) used here have a number average molecular weight ($M_n$) of preferably from 200 to 1,000,000 g/mol, particularly preferably from 1000 to 50,000 g/mol, and a viscosity of preferably from 10 to 1,000,000 mm²/s at 25° C., preferably from 20 to 100,000 mm²/s at 25° C.

Examples of radicals $R^9$ are alkyl radicals such as the methyl, ethyl, n-propyl, iso-propyl, 1-n-butyl, 2-n-butyl, iso-butyl, tert-butyl, n-pentyl, iso-pentyl, neo-pentyl and tert-pentyl radicals; hexyl radicals such as the n-hexyl radical; heptyl radicals such as the n-heptyl radical; octyl radicals such as the n-octyl radical, and iso-octyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the allyl, methallyl and hexenyl radicals; alkynyl radicals such as the propargyl radical; aryl radicals such as the phenyl, naphthyl, anthryl and phenanthryl radicals; alkaryl radicals such as o-, m-, p-tolyl radicals; xylyl radicals and ethylphenyl radicals; and aralkyl radicals such as the benzyl radical, the α- and β-phenylethyl radicals.

Examples of halogenated radicals $R^9$ are haloalkyl radicals such as the 3,3,3-trifluoro-n-propyl radical, the 2,2,2,2',2',2'-hexafluoroisopropyl radical and the heptafluoroisopropyl radical, and haloaryl radicals such as the o-, m- and p-chlorophenyl radicals. Preferred radicals $R^9$ are the methyl and phenyl radicals; particular preference is given to the methyl radical.

Examples of alkyl radicals $R^{10}$ are those examples given for the radical $R^9$ plus the methoxyethyl and ethoxyethyl radicals. The radical $R^{10}$ is preferably a methyl, ethyl, iso-propyl or methoxyethyl radical; particular preference is given to a methyl or ethyl radical.

When X is a halogen atom, it is preferably a chlorine atom. Preferred radicals X are methoxy and ethoxy radicals.

Examples of radicals $R^7$ are alkylene radicals such as —$CH_2$—$CH_2$—, —$(CH_2)_3$—, —$(CH_2)_4$— and —$CH_2$—$CH(CH_3)$—$CH_2$—, alkenylene radicals such as —$CH$=$CH$—$CH_2$—, aromatic radicals such as —$CH_2$—$CH_2$—$C_6H_4$— and —$(CH_2)_3$—$C_6H_4$—, and also radicals of the formulae —$(CH_2)_3O$—$(CH_2CH_2O)_w CH_2CH_2$— (VII), —$CH$=$CH$—$CH_2O(CH_2CH_2O)_w CH_2CH_2$— (VII'), —$(CH_2)_3O$—$(CH(CH_3)CH_2O)_w CH_2CH_2$— (VII'') and —$CH$=$CH$—$CH_2O$—$(CH(CH_3)CH_2O)_w CH_2CH_2$—, (VII'''), where w is in each case 0 or an integer from 1 to 15, for example —$CH_2CH_2$—$O$—$CH_2CH_2CH_2$—.

Preferred radicals $R^7$ are divalent, unsubstituted or halogen-substituted hydrocarbon radicals having from 1 to 35 carbon atoms which may be interrupted by one or more ether oxygen atoms. Particularly preferred radicals $R^7$ are alkylene radicals and alkenylene radicals each having from 1 to 35 carbon atoms which may be interrupted by one or more oxygen atoms, in particular the radicals —$(CH_2)_3$—, —$CH$=$CH$—$CH_2$—, —$CH_2$—$CH_2$—$C_6H_4$— and —$CH$=$CH$—$CH_2O(CH_2CH_2O)_w CH_2CH_2$— where w is as defined above.

Examples of radicals $R^8$ are the hydrogen atom and the examples given for $R^9$. The radical $R^8$ is preferably a hydrogen atom, a methyl or a phenyl radical; particular preference is given to a hydrogen atom.

Examples of radicals J are

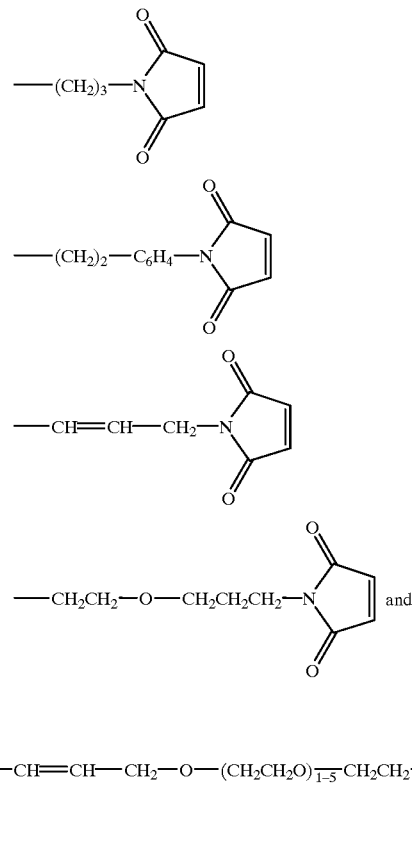

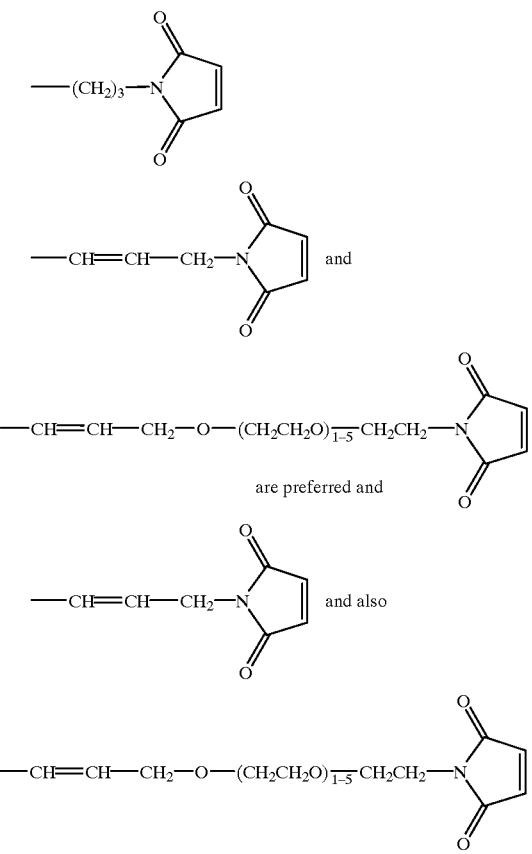

are particularly preferred.

The organosilicon compounds (E) containing maleimide groups are particularly preferably compounds of the formula $$J_g R^9_{3-g} SiO(SiR^9_2 O)_n (SiR^9 JO)_m SiR^9_{3-g} J_g \quad (VIII),$$

where J and $R^9$ are as defined above, g can be identical or different and are 0 or 1, n is 0 or an integer from 1 to 1500 and m is 0 or an integer from 1 to 200, with the proviso that at least one radical J is present per molecule and n units $(SiR^9_2 O)$ and m units $(SiR^9 JO)$ can be distributed in any way in the molecule.

Examples of the organosilicon compounds (E) containing maleimide groups used here are $Me_3SiO[(SiMe_2O)_{25-40}SiJ^1MeO]_{1-10}SiMe_3$ and $J^1$—$SiMe_2O(SiMe_2O)_{50-60}SiMe_2$—$J^1$ where $J^1$ is

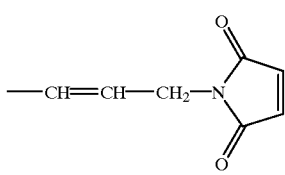

$Me_3SiO[(SiMe_2O)_{25-40}SiJ^2MeO]_{1-10}SiMe_3$ and $J^2$—$SiMe_2O(SiMe_2O)_{50-60}SiMe_2$—$J^2$ where $J^2$ is

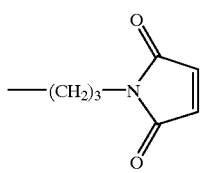

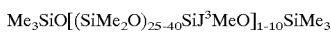

where $J^3$ is

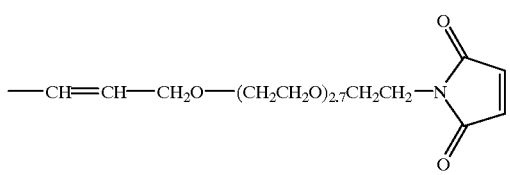

where

Me is a methyl radical.

The compound (B) used according to the invention can be a single type of compound or a mixture of various types of such compounds.

Preferred siloxane copolymers containing (methyl)styrene groups are those comprising a) siloxane units of the formula

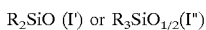

b) per molecule at least one siloxane unit of the formula

and/or per molecule
at least one unit of the formula

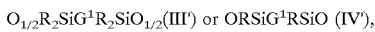

with the proviso that at least one unit (II') is present.

Also preferred as siloxane copolymers containing (methyl)styrene groups are those of the formula

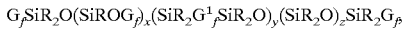

with the proviso that at least one unit G is present
where G, $G^1$ and R are as defined above and f is 0 or 1,
x is 0 or an integer from 1 to 200,
y is 0 or an integer from 1 to 50,
z is 0 or an integer from 1 to 1000.

The groups $(SiROG)_x$, $(SiR_2G^1SiR_2O)_y$ and $(SiR_2O)_z$ can be in any order desired.

The organosilicon compositions containing (methyl)styrene groups preferably have a number average molecular weight of from 500 to 1,000,000 g/mol, preferably from 5000 to 150,000 g/mol, and preferably have a viscosity of from 10 to 1,000,000 mm²/s at 25° C.

The invention further relates to a process for preparing the novel organosiloxane compositions containing (methyl)styrene groups, which comprises crosslinking (A) and (B) by means of heat and/or high-energy radiation.

If desired,

C) initiators which form free radicals, anions or cations and

D) inhibitors for regulating the pot life may be present in this process.

The organosilicon compounds (A) and the compounds (B) can be present in the compositions of the invention in a ratio which may vary within wide limits, depending on the stoichiometry of this compound. Thus, the numerical ratio of double bonds in formula (IV) —$R^4$(phenyl)-groups of the compound (A), which is substituted by [—$Y_{(5-d)}$] and (—$R^5_d$), to double bonds in the compounds (B) is preferably in the range from 0.1 to 20, particularly preferably from 0.3 to 10, in particular from 0.5 to 7.

The compositions of the invention can now be crosslinked under the action of high-energy radiation. Many types of radiation are suitable for this purpose, for instance electron beams, γ-rays, X-rays, UV light such as that having wavelengths in the range from 200 to 400 nm, and visible light such as that having a wavelength of from 400 to 600 nm, i.e. "halogen light". Ultraviolet light can be generated, for example, in xenon lamps, mercury low-pressure lamps, mercury medium-pressure lamps or mercury high-pressure lamps and excimer lamps.

A further, preferred process is a process for crosslinking the (methyl)styrene-siloxane compositions of the invention by irradiation with high-energy radiation. The high-energy radiation by means of which the compositions of the present invention are crosslinked is preferably UV light in the 200–400 nm range or electron beams, preferably light from monochromatic excimer lamps or mercury medium-pressure lamps.

The compositions of the invention can also be crosslinked purely thermally without exposure to high-energy radiation, which is why they have only a limited shelf life even in the absence of such radiation. However, this pot life is many times the crosslinking time under the action of high-energy radiation, which is why purely thermal curing is possible but not preferred.

Furthermore, it is also possible to combine photochemical and thermal crosslinking.

The (methyl)styrene-siloxane compositions of the present invention may, if desired, comprise free-radical-forming initiators (C). Although a suitable combination of component (A) with component (B) can be cured even without the discretionary constituent (C), for example by means of electron beams or excimer lamps, an addition of free-radical initiators which absorb the radiative energy and subsequently disintegrate into free radicals increases the crosslinking rate.

Examples of initiators (C) which may be used for free-radical crosslinking are preferably benzoin ethers such as benzoin n-butyl ether, benzil ketals such as benzil dimethyl ketal, α,α-dialkoxyacetophenones, such as α,α-diethoxyacetophenone, α-hydroxyalkylphenones such as 1-hydroxycyclohexyl phenyl ketone and 2-hydroxy-2-methyl-1-phenylpropan-1-one, α-aminoalkylphenones such as 2-methyl-1-[4-(methylthio)phenyl]-2-morpholinopropan-1-one, acylphosphine oxides such as 2,4,6-trimethylbenzoyldiphenylphosphine oxide and bisacylphosphine oxides such as bis(2,6-dimethoxybenzoyl) isooctylphosphine oxide.

As initiator (C) in free-radical crosslinking, ketones such as benzophenone, 1-chloro-4-propoxythioxanthone, isopropylthioxanthone and thioxanthone are likewise effective, but are better in combination with amine coinitiators such as triethanolamine or 2-n-butoxyethyl-4-(dimethylamino)benzoate, with it also being possible to use mixtures of various types of such initiators.

Examples of initiators (C) which may form cations or protons are, preferably, any type of sulfonium, iodonium or diazonium salts, complexes of $BF_3$, $AlCl_3$, $TiCl_4$ and $SnCl_4$ with water or alcohols, protic acids such as HCl and $H_2SO_4$, with it also being possible to use mixtures of various types of such initiators.

Examples of initiators (C) which may form anions are, preferably, alkali metals and their organic compounds, e.g. phenyllithium, butyllithium, phenylsodium, triphenylmethylpotassium or Alfin catalysts, with it also being possible to use mixtures of various types of such initiators.

The initiators (C) which may be used according to the invention can be a single type or a mixture of various types of such initiators.

Initiators (C) are preferably used in amounts of from 0.001 to 5% by weight, particularly preferably from 0.01 to 3% by weight, in each case based on the total weight of (A) and (B). For reasons of better handling, preference is given to admixing a mixture of (A)+(B)+(C) with small amounts of an inhibiting component (D) in order to prevent, for example, premature crosslinking of a ready-to-use formulation during storage. The task of these substances is in general to inactivate free radicals, cations or anions formed and thus to delay or prevent the commencement of, for example, a free-radical, anionic or cationic polymerization of groups of the structure:

(IV) —$R^4$-(phenyl) which is substituted by [—$Y_{(5-d)}$] and (—$R^5_3$)

with molecules of the component (B).

If large amounts of free radicals, anions or cations are set free by means of irradiation or considerable heating, this leads to the inhibitor molecules (D) being rapidly consumed and curing of the composition of the invention commences very suddenly. Examples of inhibitors (D) which may be used are all customary inhibitors (D) which have also been used hitherto in free-radical processes, for example, preferably, hydroquinone, 4-methoxyphenol, 2,6-ditert-butyl-4-methylphenol or phenothiazine. The inhibitor (D) which may be used according to the invention can be a single type or a mixture of various types of such inhibitors. Further examples of inhibitors of cationic or anionic polymerization are, preferably, potassium hydroxide, potassium sorbate, amines, alcohols, and acids.

Inhibitors (D) are preferably used in amounts of from 10 to 10,000 ppm, particularly preferably from 50 to 1000 ppm, in each case based on the total weight of the (methyl) styrene-siloxane compositions of the invention. Radiation crosslinking is preferably carried out at a temperature of from 0° C. to 100° C., particularly preferably from 20° C. to 60° C., and the pressure of the surrounding atmosphere, i.e. from 900 hPa to 1100 hPa.

It is also possible but not preferred to cure the siloxane compositions of the invention exclusively thermally, in which case the addition of free-radical-forming peroxides or azo compounds ($C_E$) is preferred. Examples of components ($C_E$) which may be added are, preferably, lauroyl peroxide, benzoyl peroxide, 2,4-dichlorobenzoyl peroxide and azobisisobutyronitrile. Further examples of ($C_E$) for cationic, thermal crosslinking are, preferably, diazonium salts or iodonium salts.

Thermal crosslinking is preferably carried out at a temperature of from −70° C. to 200° C., particularly preferably from −40° C. to 150° C., and at the pressure of the surrounding atmosphere, i.e. from 900 hPa to 1100 hPa. The surrounding atmosphere can here be air, nitrogen, xenon or another protective gas. Furthermore, the compositions of the invention can further comprise, if desired, additives such as, preferably, fillers, pigments and coupling agents such as silanes or epoxide compounds.

The invention furthermore provides a process for the application of novel organosiloxane compositions containing (methyl)styrene groups, which comprises applying the novel organosiloxane compositions containing (methyl) styrene groups to a substrate.

The invention further provides coatings or moldings comprising the novel organosiloxane compositions containing (methyl)styrene groups.

The curable siloxane compositions of the invention have the advantage that component (A) has excellent compatibility with the component (B) and clear mixtures without phase separation are therefore obtained. Furthermore, the compositions of the invention have the advantage that they crosslink in a simple manner and very easily to form solid coatings or moldings. The compositions of the invention can be used wherever crosslinkable compositions based on crosslinkable siloxane compositions have hitherto also been used. For example, the compositions of the present invention are extremely well suited to producing solid coatings or moldings. Examples of substrates are, preferably, surfaces to which the coatings of the invention can be applied, preferably surfaces of paper, wood, cork, plastic films, e.g. polyethylene films or polypropylene films, ceramic articles, glass including glass fibers, metals, boards including those of asbestos and woven or nonwoven cloth of natural or synthetic organic fibers. Examples of moldings are seals, housings, encapsulation compositions for electronic components.

The application of the (methyl)styrene-siloxane compositions of the invention or their formulations to the surfaces to be coated can be carried out in any manner suitable and widely known for the production of coatings from liquid materials, for example by dipping, painting, casting, spraying, rolling on, printing, e.g. by means of an offset gravure coating apparatus, knife or doctor blade coating. In particular, the compositions of the invention are suitable for use in non-stick coating compositions.

EXAMPLE 1

66 g (0.417 mol) of diisopropenylbenzene and 0.332 g of a 1,3-divinyl-1,1,3,3-tetramethyldisiloxane-platinum(O) complex in toluene having a platinum content (based on pure metal) of 1% by weight are initially charged to a reactor at room temperature with stirring. Over a period of two hours, 100 g of a polysiloxane comprising trimethylsiloxy, hydrogendimethylsiloxy, dimethylsiloxy and hydrogenmethylsiloxy units, having a viscosity at 25° C. of 31 $mm^2/s$ and containing 0.13% by weight of hydrogen bound to silicon are added dropwise, the temperature rising to 40° C. The reaction mixture is subsequently stirred further for six hours at 40° C. After the reaction is complete, the product is evaporated to constant weight at 120° C. in a high vacuum and filtered, yielding 110 g (90.2% of theory) of a clear, yellow oil having a viscosity of 138 $mm^2/s$ at 25° C. (Poly 1).

EXAMPLE 2

28.5 g (0.18 mol) of diisopropenylbenzene and 0.257 g of the platinum catalyst described in Example 1 are initially charged to a reactor at room temperature with stirring. Over a period of one hour, 100 g of a polysiloxane comprising trimethylsiloxy, dimethylsiloxy and hydrogenmethylsiloxy units, having a viscosity at 25° C. of 395 $mm^2/s$ and containing 0.06% by weight of hydrogen bound to silicon are added dropwise, with the temperature rising to 35° C. The reaction mixture is subsequently stirred further for six hours at room temperature. After the reaction is complete, the product is evaporated to constant weight at 120° C. in a high vacuum and filtered, yielding 105 g (95.9% of theory) of a clear, brownish oil having a viscosity of 1585 mm²/s at 25° C. (Poly 2).

EXAMPLE 3

95 g (0.6 mol) of diisopropenylbenzene and 0.39 g of the platinum catalyst described in Example 1 are initially charged to a reactor at room temperature with stirring. Over a period of three hours, 100 g of a polysiloxane comprising hydrogendimethylsiloxy and dimethylsiloxy units, having a viscosity of 7.2 mm²/s at 25° C. and containing 0.2% by weight of hydrogen bound to silicon are added dropwise, with the temperature rising to 45° C. The reaction mixture is subsequently stirred further for six hours at room temperature. After the reaction is complete, the product is evaporated to constant weight at 120° C. in a high vacuum and filtered, yielding 123 g (93.4% of theory) of a clear, brown oil having a viscosity of 30 mm²/s at 25° C. (Poly 3).

EXAMPLE 4

13 g (0.082 mol) of diisopropenylbenzene, 0.226 g of the platinum catalyst described in Example 1 and 100 g of a polysiloxane comprising hydrogendimethylsiloxy and dimethylsiloxy units, having a viscosity of 170 mm²/s at 25° C. and containing 0.027% by weight of hydrogen bound to silicon are stirred for seven hours at 30° C. After the reaction is complete, the product is evaporated to constant weight at 120° C. in a high vacuum and is then filtered, yielding 102 g (97.8% of theory) of a clear, pale brown oil having a viscosity of 710 mm²/s at 25° C. (Poly 4).

EXAMPLE 5

Example 4 is repeated as described above, except that 10.7 (0.082 mol) of divinylbenzene are used in place of 13 g of diisopropenylbenzene, yielding 101 g (97.6% of theory) of a clear, slightly yellow oil having a viscosity of 690 mm²/s at 25° C. (Poly 5).

General method of radiation curing

The formulations below are spread in a thickness of from about 2 to 3 mm on a glassine paper (hard-calendered paper whose surface has been treated with polyvinyl alcohol, e.g. Bosso 925 from Bosso) by means of a glass rod. Curing is carried out under a microwave-excited medium-pressure mercury lamp from Fusion at 120 W/cm; if desired, the entire curing channel can be made inert with nitrogen down to a residual oxygen content of about 30 ppm. The irradiation time can be regulated by means of the speed of a conveyor belt to which the coated paper is fixed and which passes under the radiation source.

EXAMPLE 6

2 g of Poly 1 (0.987 mmol of —C(CH₃)=CH₂/g) are mixed with 0.465 g of triglycol divinyl ether (9.9 mmol of —O—CH=CH₂/g) having a viscosity of 2.7 mm²/s at 25° C. and 0.049 g of a 50% strength by weight solution of

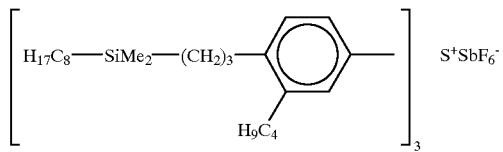

in isopropyl myristate. Curing is carried out at a web speed of 3 m/min under nitrogen and in air. In both cases, a smear-free silicone coating is obtained.

EXAMPLE 7

2 g of Poly 2 (0.52 mmol of —C(CH₃)=CH₂/g) are mixed with 0.23 g of dibutyl fumarate (4.4 mmol of —CH=CH—/g). Curing is carried out under nitrogen at a web speed of 2 m/min. A smear-free silicone coating is obtained.

EXAMPLE 8

2 g of Poly 3 (1.51 mmol of —C(CH₃)=CH₂/g), 0.26 g of methylacrylate (11.6 mmol of H₂C=CH—/g) are mixed with 0.045 g of 2-hydroxy-2-methyl-1-phenylpropan-1-one (Darocur® 1173 from Ciba Geigy). Curing is carried out under nitrogen at a web speed of 5 m/min. A smear-free silicone coating is obtained.

EXAMPLE 9

2 g of Poly 1 (0.987 mmol of —C(CH₃)=CH₂/g) and 4.2 g of a polysiloxane comprising trimethylsiloxy, dimethylsiloxy and 3-N-maleimidoprop-1-enylmethylsiloxy units and having a viscosity of 2770 mm²/s at 25° C. (0.47 mmol of —CH=CH—/g) are mixed. Curing is carried out under nitrogen at a web speed of 12.5 m/min and in air at 8.5 m/min. In both cases, a smear-free silicone coating is obtained.

EXAMPLE 10

10 g of Poly 5 are mixed with 0.2 g of Darocur® 1173 (from Ciba Geigy). Curing is carried out under nitrogen at a web speed of 15 m/min. A smear-free silicone coating is obtained.

EXAMPLE 11

10 g of Poly 4 are treated at −25° C. in a glass flask with 0.5 g of a 15% strength by weight solution of butyllithium in n-hexane. Spontaneous curing occurs. A transparent mass which is insoluble in organic solvents is obtained.

EXAMPLE 12

2.37 g of Poly 1 (0.987 mmol of —C(CH₃)=CH₂/g) and 5.12 g of a polysiloxane comprising trimethylsiloxy and 11-vinyloxy-3,6,9-trioxaundecenylmethylsiloxy units (2.94 mmol of —O—CH=CH₂/g) and having a viscosity of 54 mm²/s at 25° C. are mixed with 0.15 g of the sulfonium salt described in Example 6. Curing is carried out at a web speed of 8 m/min under nitrogen and in air. In both cases, a smear-free silicone coating is obtained.

EXAMPLE 13

1 g of Poly 1 (0.987 mmol of —C(CH₃)=CH₂/g) are admixed with 2.06 g of a polysiloxane comprising dimethylsiloxy and alkenediylbis(oxapropyl acrylate)methylsiloxy units and having a viscosity of 355 mm²/s at 25° C. and with 0.1 g of Darocur® 1173 (from Ciba Geigy). Curing is carried out at a web speed of 18 m/min under nitrogen. A smear-free silicone coating is obtained.

What is claimed is:

1. An organosiloxane composition which contains (methyl)styrene groups, prepared from
    A) oligomeric or polymeric organosilicon compounds comprising at least one unit of the formula $$GR_cSiO_{(4-c-1)/2} \quad (I)$$

or at least one unit of the formula (I) and at least one unit of the formula $$O_{(4-c-1)/2}R_cSi\text{—}G^1\text{—}R_cSiO_{(4-c-1)/2} \quad (II)$$

and
    B) monomeric alkenyloxy compounds, maleates, fumarates, maleimides, (meth)acrylates, (methyl) styrenes, acrylamides, itaconic esters, oligomeric or polymeric organosilicon compounds containing on average more than one alkenyloxy, maleate, fumarate, maleimide or (meth)acrylate group, or mixtures thereof,
    where R are identical or different hydrocarbon radicals which may be halogenated or unhalogenated where
    G is a radical of the formula (IV) —R⁴-(phenyl) which is substituted by (—Y$_{(5-d)}$) and (—R⁵$_d$), with the proviso that at least one radical R⁵ is present and
    G¹ is a radical of the formula (V) —(phenyl)-(R⁴)$_d$— which is substituted by (—Y$_{(4-d)}$), where
    R⁴ is a linear or branched, substituted or unsubstituted alkylene radical,
    R⁵ is a vinyl radical or isopropenyl radical,
    Y can be identical or different and each Y is a hydrogen atom, or is as defined for R, or is a radical of the formula —OR⁶, where
    R⁶ is an identical or different alkyl radical having 1 to 8 carbon atoms per radical optionally substituted by an ether oxygen atom, and
    c is 0, 1 or 2, on average from 0.0 to 2.0,
    d is 1, 2 or 3.

2. An organosiloxane composition containing (methyl) styrene groups as claimed in claim 1, additionally comprising units of the formula $$R_aSi(OR^6)_bO_{(4-a-b)/2} \quad (III),$$

where
    R is as defined above and
    R⁶ are identical or different alkyl radicals having from 1 to 8 carbon atom(s) per radical, optionally substituted by an ether oxygen atom,
    a, b are 0, 1, 2 or 3 and the sum a+b is not greater than 3.

3. The composition of claim 1 further comprising a catalyst which accelerates the reaction of (A) with (B).

4. The composition of claim 1 further comprising an inhibitor which scavenges species which accelerate the reaction of (A) with (B).

5. A process for preparing cured organosiloxane compositions containing (methyl)styrene groups as claimed in claim 1, which comprises crosslinking (A) and (B) by means of heat and/or high-energy radiation.

6. The process of claim 5 wherein said cured organosiloxane comprises a coating or molding.

7. A process for the preparation of a cured organosiloxane coating comprising applying the composition of claim 1 to a substrate and curing said composition.

8. A process for preparing cured organosiloxane compositions containing (methyl)styrene groups as claimed in claim 2, which comprises crosslinking (A) and (B) by means of heat and/or high-energy radiation.

9. The process of claim 8 wherein said cured organosiloxane comprises a coating or molding.

10. A process for the preparation of a cured organosiloxane coating comprising applying the composition of claim 2 to a substrate and curing said composition.

11. A process for the preparation of a cured organosiloxane coating comprising applying the composition of claim 3 to a substrate and curing said composition.

12. The composition of claim 1, further comprising at least one of a filler or pigment.

13. An organosiloxane composition which contains (methyl)styrene groups, prepared from
    A) oligomeric or polymeric organosilicon compounds comprising at least one unit of the formula $$GR_cSiO_{(4-c-1)/2} \quad (I)$$

or at least one unit of the formula (I) and at least one unit of the formula $$O_{(4-c-1)/2}R_cSi\text{—}G^1\text{—}R_cSiO_{(4-c-1)/2} \quad (II)$$

and
    B) oligomeric or polymeric organosilicon compounds containing on average more than one alkenyloxy, maleate, fumarate, maleimide or (meth)acrylate group, or mixtures thereof, where R are identical or different hydrocarbon radicals which may be halogenated or unhalogenated or is a radical of the formula $$\text{—}R^1\text{—}\{OCH_2CH_2\}_o\text{—}\{OCH(CH_3)CH_2\}_p\text{—}\{O(CH_2)_4\}_q\text{—}OR^2,$$

where
    R¹ is a linear or branched alkylene radical,
    R² is a hydrogen atom, an alkyl radical or a radical of the formula —CO—R³, where R³ is an alkyl radical,
    G is a radical of the formula (IV) —R⁴-(phenyl) which is substituted by (—Y$_{(5-d)}$) and (—R⁵$_d$), with the proviso that at least one radical R⁵ is present and
    G¹ is a radical of the formula (V) —(phenyl)-(R⁴)$_d$— which is substituted by (—Y$_{(4-d)}$), where
    R⁴ is a linear or branched, substituted or unsubstituted alkylene radical,
    R⁵ is a vinyl radical or isopropenyl radical,
    Y can be identical or different and each Y is a hydrogen atom, or is as defined for R, or is a radical of the formula —OR⁶, where
    R⁶ is an identical or different alkyl radical having 1 to 8 carbon atoms per radical optionally substituted by an ether oxygen atom, and
    c is 0, 1 or 2, on average from 0.0 to 2.0,
    d is 1, 2 or 3,
    o is 0 or an integer from 1 to 100,
    p is 0 or an integer from 1 to 100, and
    q is 0 or an integer from 1 to 100, with the proviso that the sum o+p+q is >0.

14. An organosiloxane composition containing (methyl) styrene groups as claimed in claim 13, additionally comprising units of the formula $$R_aSi(OR^6)_bO_{(4-a-b)/2} \quad (III),$$

where

R is as defined above and $R^6$ are identical or different alkyl radicals having from 1 to 8 carbon atom(s) per radical, optionally substituted by an ether oxygen atom, a, b are 0, 1, 2 or 3 and the sum a+b is not greater than 3.

15. A release material comprising a film of paper or plastic, said film coated with the cured reaction product of A) oligomeric or polymeric organosilicon compounds comprising at least one unit of the formula $$GR_cSiO_{(4-c-1)/2} \quad (I)$$

or at least one unit of the formula (I) and at least one unit of the formula $$O_{(4-c-1)/2}R_cSi\text{—}G^1\text{—}R_cSiO_{(4-c-1)/2} \quad (II)$$

and

B) monomeric alkenyloxy compounds, maleates, fumarates, maleimides, (meth)acrylates, (methyl) styrenes, acrylamides, itaconic esters, oligomeric or polymeric organosilicon compounds containing on average more than one alkenyloxy, maleate, fumarate, maleimide or (meth)acrylate group, or mixtures thereof, where R are identical or different hydrocarbon radicals which may be halogenated or unhalogenated or is a radical of the formula $$-R^1-\{OCH_2CH_2\}_o-\{OCH(CH_3)CH_2\}_p-\{O(CH_2)_4\}_q-OR^2,$$

where $R^1$ is a linear or branched alkylene radical, $R^2$ is a hydrogen atom, an alkyl radical or a radical of the formula —CO—$R^3$, where $R^3$ is an alkyl radical, G is a radical of the formula (IV) —$R^4$-(phenyl) which is substituted by (—$Y_{(5-d)}$) and (—$R^5{}_d$), with the proviso that at least one radical $R^5$ is present and $G^1$ is a radical of the formula (V) —(phenyl)-$(R^4)_d$— which is substituted by (—$Y_{(4-d)}$), where $R^4$ is a linear or branched, substituted or unsubstituted alkylene radical, $R^5$ is a vinyl radical or isopropenyl radical, Y can be identical or different and each Y is a hydrogen atom, or is as defined for R, or is a radical of the formula —$OR^6$, where $R^6$ is an identical or different alkyl radical having 1 to 8 carbon atoms per radical optionally substituted by an ether oxygen atom, and c is 0, 1 or 2, on average from 0.0 to 2.0, d is 1, 2 or 3, o is 0 or an integer from 1 to 100, p is 0 or an integer from 1 to 100, and q is 0 or an integer from 1 to 100, with the proviso that the sum o+p+q is >0.

16. The release material of claim 15, wherein said organosiloxane composition additionally comprises units of the formula $$R_aSi(OR^6)_bO_{(4-a-b)/2} \quad (III),$$

where

R is as defined above and $R^6$ are identical or different alkyl radicals having from 1 to 8 carbon atom(s) per radical, optionally substituted by an ether oxygen atom, a, b are 0, 1, 2 or 3 and the sum a+b is not greater than 3.

17. A release material comprising a film of paper or plastic, said film coated with the cured reaction product of an organosiloxane composition which contains (methyl) styrene groups, prepared from A) oligomeric or polymeric organosilicon compounds comprising at least one unit of the formula $$GR_cSiO_{(4-c-1)/2} \quad (I)$$

or at least one unit of the formula (I) and at least one unit of the formula $$O_{(4-c-1)/2}R_cSi\text{—}G^1\text{—}R_cSiO_{(4-c-1)/2} \quad (II)$$

and

B) oligomeric or polymeric organosilicon compounds containing on average more than one alkenyloxy, maleate, fumarate, maleimide or (meth)acrylate group, or mixtures thereof, where R are identical or different hydrocarbon radicals which may be halogenated or unhalogenated or is a radical of the formula $$-R^1-\{OCH_2CH_2\}_o-\{OCH(CH_3)CH_2\}_p-\{O(CH_2)_4\}_q-OR^2$$

where $R^1$ is a linear or branched alkylene radical, $R^2$ is a hydrogen atom, an alkyl radical or a radical of the formula —CO—$R^3$, where $R^3$ is an alkyl radical, G is a radical of the formula (IV) —$R^4$-(phenyl) which is substituted by (—$Y_{(5-d)}$) and (—$R^5{}_d$), with the proviso that at least one radical $R^5$ is present and $G^1$ is a radical of the formula (V) —(phenyl)-$(R^4)_d$— which is substituted by (—$Y_{(4-d)}$), where $R^4$ is a linear or branched, substituted or unsubstituted alkylene radical, $R^5$ is a vinyl radical or isopropenyl radical, Y can be identical or different and each Y is a hydrogen atom, or is as defined for R, or is a radical of the formula —$OR^6$, where $R^6$ is an identical or different alkyl radical having 1 to 8 carbon atoms per radical optionally substituted by an ether oxygen atom, and c is 0, 1 or 2, on average from 0.0 to 2.0, d is 1, 2 or 3, o is 0 or an integer from 1 to 100, p is 0 or an integer from 1 to 100, and q is 0 or an integer from 1 to 100, with the proviso that the sum o+p+q is >0.

18. The release material of claim 17, wherein said organosiloxane composition additionally comprises units of the formula $$R_aSi(OR^6)_bO_{(4-a-b)/2} \quad (III),$$

where

R is as defined above and $R^6$ are identical or different alkyl radicals having from 1 to 8 carbon atom(s) per radical, optionally substituted by an ether oxygen atom, a, b are 0, 1, 2 or 3 and the sum a+b is not greater than 3.

19. A release material comprising a film of paper or plastic, said film coated with the cured reaction product of an organosiloxane composition which contains (methyl)styrene groups, prepared from A) oligomeric or polymeric organosilicon compounds comprising at least one unit of the formula $$GR_cSiO_{(4-c-1)/2} \qquad (I)$$

or at least one unit of the formula (I) and at least one unit of the formula $$O_{(4-c-1)/2}R_cSi\text{---}G^1\text{---}R_cSiO_{(4-c-1)/2} \qquad (II)$$

and

B) monomeric alkenyloxy compounds, maleates, fumarates, maleimides, (meth)acrylates, (methyl)styrenes, acrylamides, or itaconic esters containing on average more than one unsaturated group per molecule, or oligomeric or polymeric organosilicon compounds containing on average more than one alkenyloxy, maleate, fumarate, maleimide or (meth)acrylate group, or mixtures thereof, where R are identical or different hydrocarbon radicals which may be halogenated or unhalogenated or is a radical of the formula $$\text{---}R^1\text{---}\{OCH_2CH_2\}_o\text{---}\{OCH(CH_3)CH_2\}_p\text{---}\{O(CH_2)_4\}_q\text{---}OR^2,$$

where $R^1$ is a linear or branched alkylene radical, $R^2$ is a hydrogen atom, an alkyl radical or a radical of the formula $\text{---}CO\text{---}R^3$, where $R^3$ is an alkyl radical, G is a radical of the formula (IV) $\text{---}R^4\text{-(phenyl)}$ which is substituted by $(\text{---}Y_{(5-d)})$ and $(\text{---}R^5{}_d)$, with the proviso that at least one radical $R^5$ is present and $G^1$ is a radical of the formula (V) $\text{---}(\text{phenyl})\text{-}(R^4)_d\text{---}$ which is substituted by $(\text{---}Y_{(4-d)})$, where $R^4$ is a linear or branched, substituted or unsubstituted alkylene radical, $R^5$ is a vinyl radical or isopropenyl radical, Y can be identical or different and each Y is a hydrogen atom, or is as defined for R, or is a radical of the formula $\text{---}OR^6$, where $R^6$ is an identical or different alkyl radical having 1 to 8 carbon atoms per radical optionally substituted by an ether oxygen atom, and c is 0, 1 or 2, on average from 0.0 to 2.0, d is 1, 2 or 3, o is 0 or an integer from 1 to 100, p is 0 or an integer from 1 to 100, and q is 0 or an integer from 1 to 100, with the proviso that the sum o+p+q is >0.

20. The release material of claim 19, wherein the organosiloxane composition containing (methyl)styrene groups additionally comprises units of the formula $$R_aSi(OR^6)_bO_{(4-a-b)/2} \qquad (III),$$

where

R is as defined above and $R^6$ are identical or different alkyl radicals having from 1 to 8 carbon atom(s) per radical, optionally substituted by an ether oxygen atom, a, b are 0, 1, 2 or 3 and the sum a+b is not greater than 3.

* * * * *